United States Patent [19]

Praetorius et al.

[11] 4,129,717
[45] Dec. 12, 1978

[54] LUBRICANTS USED IN THE PROCESSING OF PLASTICS

[75] Inventors: Heinz Praetorius; Karl Seibert, both of Duren; Werner Holtvoigt, Lonne-Riessel, all of Germany

[73] Assignee: Akzona Incorporated, Asheville, N.C.

[21] Appl. No.: 860,509

[22] Filed: Dec. 14, 1977

[30] Foreign Application Priority Data

Dec. 16, 1976 [DE] Fed. Rep. of Germany ....... 2656932

[51] Int. Cl.$^2$ ............................................. C08L 59/00
[52] U.S. Cl. ................................. 528/421; 252/52 A; 260/28.5 D; 260/899; 568/624
[58] Field of Search ................... 260/2 A, 615 B, 899, 260/28.5 D; 252/52 A

[56] References Cited

U.S. PATENT DOCUMENTS

| | | | |
|---|---|---|---|
| 2,522,155 | 9/1950 | Ballard et al. | 260/2 A |
| 3,029,216 | 4/1962 | Bailey, Jr. et al. | 260/615 B |
| 3,829,506 | 8/1974 | Schmolka et al. | 260/615 B |
| 3,956,401 | 5/1976 | Scardera et al. | 260/615 B |

Primary Examiner—Melvyn I. Marquis
Attorney, Agent, or Firm—Francis W. Young; Robert F. Green

[57] ABSTRACT

Lubricants comprising a random polyalkylene oxide copolymer are disclosed. The lubricants are random copolymers made from ethylene oxide or propylene oxide or a mixture thereof, and a monomer selected from the group consisting of aliphatic, non-substituted, 1,2-alkylene oxides containing from about 6 to about 40 carbon atoms, and mixtures thereof are disclosed.

4 Claims, No Drawings

LUBRICANTS USED IN THE PROCESSING OF PLASTICS

BACKGROUND OF THE INVENTION

This invention relates to lubricants for use in the processing of plastics, and in particular, to lubricants for use during the shaping of thermoplastic polymers.

In the known methods for processing thermoplastic polymers, shaping is carried out under high temperature and pressure loads. The heated plastic mass tends to adhere to heated machinery parts, especially when the processing of the thermoplastic materials involves injection molding, extruding, calendering or rolling. The adhering material thus has a longer dwell time in the machines, as a result of which thermal degradation of the thermoplastic polymer occurs, which may thus require interruption of a processing operation. When polyvinyl chloride is processed, a result of the thermal degradation in combination with the limited useful life of typical stabilizers, may be the splitting off of hydrochloric acid.

In order to avoid the foregoing processing difficulties, auxiliary processing agents are typically added to the plastic powder in addition to the customary stabilizers, the agents tending to facilitate the flow of the melted mass and to eliminate adhering of the plastic to the heated surfaces of the machinery parts.

Typical auxiliary processing agents include lubricants and flowing aids which are added to the thermoplastic polymer. In the case of lubricants, one may differentiate between internal and external lubricants. The internal lubricants are intended to serve an increase in melting velocity and in their case a reduction in internal friction, thus a certain internal lubrication is important, which presupposes an adequate compatibility of a lubricant with a plastic. External lubricants sometimes also referred to as parting agents, serve to prevent adhering to the hot machinery parts and in such a case, less compatibility with a plastic is required, so that the lubricant will difuse between the plastic material and the heated machinery parts, and thus cause a lubricating effect at the interphase between the metal and the melt.

Wax esters, such as the cetyl ester, of palmitic acid, fatty alcohols, as well as fatty acid partial esters of glycerine, such as glycerine mono-oleate, are known to be excellent internal lubricants. Among the external lubricants with good parting effect are fatty acids, fatty acid amides, fatty acid esters, lower alcohols, natural parafin hydrocarbons, and hardened glycerides. Polyalkylene oxides of low 1,2-alkylene oxide have already been proposed as lubricants. In German Pat. No. 1,133,544, the use of polyethylene oxides as lubricants in the manufacture, without plasticizer, of rolled film made of vinyl chloride polymers and copolymers is described. In addition to polyethylene oxide, the corresponding British Pat. No. 887,353 also mentions polypropylene oxide, as well as copolymers of ethylene oxide and propylene oxide as suitable lubricants. Japanese Pat. No. 43-26088 teaches the use of polyisobutylene oxide, with a reduced viscosity of at most 1.5, as a processing aid in the processing of polyvinyl chloride. However, lubricants such as the foregoing are suitable only for narrow fields of application, so that the previously utilized conventional lubricants, such as wax esters, fatty alcohols, fatty acid amides, fatty acid esters, as well as their combinations, continue to find wide application.

Selection and dosage of the lubricant depend primarily upon the temperature and pressure stresses prevailing during processing, but also upon the characteristics of the other components of the mixture, as well as upon the desired characteristics of the finished product. For practicing certain processing methods, one may be forced to use combinations of several lubricant types, as each lubricant is typically designed for accomplishing only one specific goal. However, despite the possibility of improving the characteristics of one lubricant through combination thereof with another lubricant, it is unavoidable that products with overlapping characteristics will result from the mixture. The necessity of developing a special mixture for a special case, which is by no means a rare occurrence, involves considerable expenditure for the processor. Nevertheless, even if lubricant combinations are utilized, incompatibility effects, such as "blooming", cannot be avoided, if one maintains the minimum quantities of lubricant required to attain adequate freedom from adhesion.

An object of the present invention, therefore, is to provide a lubricant which, in its actions as an internal and external lubricant, can be adjusted in such a way that there will be no risk of incompatibility, and optimal processing conditions will be made possible.

SUMMARY OF THE INVENTION

The foregoing object, and others, are achieved by providing a lubricant for use in processing thermoplastic polymers, comprising a random polyalkylene copolymer made from ethylene oxide or propylene oxide, or a mixture thereof, and a monomer selected from the group consisting of aliphatic, non-substituted, 1,2-alkylene oxides containing from about 6 to about 40 carbon atoms, and mixtures thereof, the ethylene oxide or propylene oxide or mixture thereof being present in an amount from about 40 weight percent to about 60 weight percent, and the copolymer having an average molecular weight from about 1,000 to about 10,000.

The present invention also provides an improved method for processing thermoplastic polymers in which said polymers are shaped by subjecting said polymers to high temperature and pressure conditions, the improvement comprising adding to said polymers prior to subjecting them to said high temperature and pressure conditions, from about 0.05% to about 2%, based on the weight of the polymer, of a lubricant comprising a random polyalkylene oxide copolymer made from ethylene oxide or propylene oxide, or a mixture thereof, and a monomer selected from the group consisting of aliphatic, non-substituted, 1,2-alkylene oxides containing from about 6 to about 40 carbon atoms, and mixtures thereof, the ethylene oxide or propylene oxide or mixtures thereof, being present in an amount from about 40 weight percent to about 60 weight percent, and the copolymer having an average molecular weight from about 1,000 to about 10,000.

DETAILED DESCRIPTION OF THE INVENTION

Suitable monomeric aliphatic, non-substituted, 1,2-alkylene oxides, for use in practicing the present invention include 1,2-epoxyhexane; 1,2-epoxyheptane; 1,2-epoxyoctane; 1,2-epoxynonane; 1,2-epoxydecane; 1,2-epoxyundecane; 1,2-epoxydodecane; 1,2-epoxytridecane; 1,2-epoxytetradecane; 1,2-epoxypentadecane; 1,2-epoxyhexadecane; 1,2-epoxyheptadecane; 1,2-epoxyoctadecane; 1,2-epoxynonadecane; 1,2-epoxyicosane; 1,2- epxyunicosane; 1,2-epoxydocosane; 1,2-epoxytricosane; 1,2-epoxytetracosane; 1,2-epoxypentacosane; 1,2-epoxyhexacosane; 1,2-epoxyheptacosane; 1,2-epoxyoctacosane; 1,2-epoxynonacosane; 1,2-epoxytriacontane; 1,2-epoxyuntriacontane; 1,2-epoxydotriacontane; 1,2-epoxytritriacontane; 1,2-epoxyptetratriacontane; 1,2-epoxypentatriacontane; 1,2-epoxyhexatriacontane; 1,2-epoxyheptatriacontane; 1,2-epoxyoctatriacontane; 1,2-epoxynonatriacontane; and 1,2-epoxytetracontane.

1,2-alkylene oxides with from about 10 to about 20 carbon atoms in the monomeric molecule have been found to be especially suitable. Good lubricants pursuant to the present invention may be obtained if the average molecular weight of the random copolymers is from about 1,000 to about 10,000, preferably from about 2,000 to about 7,000. The average molecular weights referred to in this application, unless otherwise indicated, are determined with the aid of gel permeation chromatography in micro-Styragel columns (company publication A.N. 143, June 1974 of Waters Associates).

Especially desirable lubricants, in which the internal and external lubricating effects may be adjusted especially well, are random copolymers in which the aliphatic, unsubstituted 1,2-alkylene oxides containing from about 6 to about 40 carbon atoms are present in an amount from about 40 to about 60 weight percent and the ethylene oxide or propylene oxide, or mixture thereof, is present in an amount from about 60 to about 40 weight percent, based on the weight of the copolymer.

The lubricants pursuant to the present invention may contain up to about 5% by weight of other unpolymerized monomers, without impairment of their effectiveness. Preparation of the random copolymers is carried out in a known manner, by polymerization in the presence of alkaline catalysts. Alkali hydroxides and basic salts are especially well suited. It has been found to be especially advantageous if such catalysts are left in the finished product.

In order to obtain the random copolymers, the monomeric 1,2-alkylene oxides containing from about 6 to about 40 carbon atoms are jointly reacted with ethylene oxide, propylene oxide, or a mixture thereof, in the presence of an alkaline catalyst, in a single-stage process.

The lubricants pursuant to the the present invention exert a regulating influence on the processing conditions, in quantities which are considerably smaller than that required with conventional lubricants and permit a high degree of freedom from adhesion during shaping, without the occurrence of any incompatibility phenomena. The addition of lubricants amounts to 0.05 to 2% by weight, based on the quantity, by weight, of the plastic.

The films and bottles made by using the lubricants pursuant to the present invention display high transparency and a smooth surface. In the case of these, as well as of other methods of processing, the mechanical characteristics of the products are at least equal, or improved.

The lubricants of the present invention may advantageously be added to all plastics, in particular to thermoplastic materials. However, they are especially well suited for the processing of polymers containing chlorine, such as polyvinyl chloride, polyvinylidene chloride, and mixed vinyl chloride polymers, whereby differences in the K value of the polyvinyl chloride types have less effect than in the case of conventional lubricants. The K value of polyvinyl chlorides is defined as $10^3 k$ from the equation $$\log \eta \text{ rel}/c = (75k^2/1 + 1.5kc) + k$$

(see "Encyclopedia of Polymer Science and Technology", 1971, vol. 14, page 517).

The applicability of the lubricants pursuant to the present invention is not limited by the nature of the stabilizers and other additives used during processing. If necessary, the lubricants of the present invention may also be added in so-called mono-component stabilizers. The addition of the lubricants pursuant to the invention can be made in such a way, that they are added to the molding batch to be processed before molding. The lubricant may be added to the finished polymer, or also to the monomers before polymerization. Homogenizing of the mixture consisting of lubricants, plastic powder, and the other additions, such as stabilizers, fillers, and pigments, may be performed in a known manner, in a heating-cooling mixture, in a set of mixing rollers, in a masticater, or in an extruder.

The present invention is further exemplified in the following non-limiting examples:

EXAMPLE 1

Preparation of Random Copolymers from 1,2-Epoxydodecane and Ethylene Oxide

A stainless steel autoclave with agitator and thermometer was charged with 138 g of 1,2-epoxydodecane (0.75 mol) and 28 g of 88/92% industrial grade caustic potash, flushed with dry nitrogen while being agitated, heated to 100° C after closing of the reaction vessel and for 60 minutes kept at this temperature under a vacuum (20 Torr), whereby polymerization was not initiated. The foregoing was followed by heating to 140° C with continuous introduction of 330 g ethylene oxide (7.5 mol) for 5 hours. After cooling to room temperature, the reaction product constituted a white, solid mass with a melting range from 48° to 52° C and an average molecular weight of 5600 (determined by means of gel permeation chromatography, using micro-Styragel columns of the firm Waters Associates, as described in their company publication AN 143, of June 1974). Random mixed polymers with other weight ratios of 1,2-epoxydodecane to ethylene oxide were made in the same manner, whereby, in keeping with the ratios of 90:10, 60:40, and 10:90, the molecular weight increased from 2900 via 4800 and 6000 to 9000, respectively.

The gel permeation chromatography used in the case of the examples involves a high-pressure, separation-chromatographic method, in which a mixture is separated according to the molecular weight. A relationship exists between retention time and molecular weight, so that the molecular weight can be determined by using calibrating substances. Polyethylene glycols of different molecular weights were used as calibrating substances in the measurements for the examples. Otherwise, tetrahydrofuran was used as mobile phase and a differential refractometer served as the detector. The column was a micro-Styragel column of the firm Waters Associates as described in their company publication AN 143, June 1974.

EXAMPLE 2

Application of the Lubricant pursuant to the Invention 100 parts of a dispersion of polyvinyl chloride (K value 70), 1 part octyl tin sulfide stabilizer and 0.15 parts of a random copolymer with an average molecular weight of 5600, according to Example 1, are premixed for 1 minute in a high-speed laboratory mixer. The mixture is plasticized for about 10 minutes at a temperature of 180° C on a 2-roller laboratory rolling mill with a roll diameter of 100 × 225 mm, a gap width of 0.8 to 1 mm and a speed of about 20 rpm, whereupon the duration of rolling at 180° C until the breakdown of lubrication (adhering to the rollers) and/or the breakdown of stablity (complete blackening of the film when the degradation point is reached) was determined.

The breakdown of stability was recorded after a duration of rolling amounting to 120 minutes and the lubricating effect was still present after 140 minutes, showing the operability of the lubricants of the present invention.

What is claimed is:

1. A lubricant for use in processing thermoplastic polymers, comprising a random polyalkylene copolymer made from ethylene oxide or propylene oxide, or a mixture thereof, and a monomer selected from the group consisting of aliphatic, non-substituted, 1,2-alkylene oxides containing from about 6 to about 40 carbon atoms, and mixtures thereof, the ethylene oxide or propylene oxide, or mixture thereof, being present in an amount from about 40 to about 60 percent, by weight, based on the total weight of the copolymer and the copolymer having an average molecular weight from about 1,000 to about 10,000.

2. The lubricant of claim 1 in which the copolymer has an average molecular weight from about 2,000 to about 7,000.

3. An improved method for processing thermoplastic polymers in which said polymers are shaped by subjecting the polymers to high temperature and pressure conditions, the improvement comprising adding to said polymers, prior to subjecting them to said high temperature and pressure conditions, from about 0.05 to about 2.0 percent, based on the weight of the copolymer, of a lubricant comprising a random polyalkylene oxide copolymer made from ethylene oxide, or propylene oxide, or a mixture thereof, and a monomer selected from the group consisting of aliphatic, non-substituted, 1,2-alkylene oxides containing from about 6 to about 40 carbon atoms, and mixtures thereof, the ethylene oxide or propylene oxide, or mixture thereof, being present in an amount from about 40 percent to about 60 percent, based on the weight of the copolymer, and the copolymer having an average molecular weight from about 1,000 to about 10,000.

4. The process of claim 3 wherein the copolymer has an average molecular weight from about 2,000 to about 7,000.

* * * * *